United States Patent
Silverbrook

(10) Patent No.: US 7,125,337 B2
(45) Date of Patent: *Oct. 24, 2006

(54) VIDEO GAMING DEVICE WITH INTEGRAL PRINTER FOR PRINTING GAMING IMAGES AT LEAST PARTIALLY BASED ON AT LEAST SOME OF THE DISPLAY IMAGES

(75) Inventor: Kia Silverbrook, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 22 days.

This patent is subject to a terminal disclaimer.

(21) Appl. No.: 10/920,286

(22) Filed: Aug. 18, 2004

(65) Prior Publication Data

US 2005/0043099 A1 Feb. 24, 2005

Related U.S. Application Data

(63) Continuation of application No. 10/636,194, filed on Aug. 8, 2003, which is a continuation-in-part of application No. 09/437,007, filed on Nov. 9, 1999, now Pat. No. 6,835,135.

(30) Foreign Application Priority Data

Nov. 9, 1998 (AU) .................................. PP7020

(51) Int. Cl.
*A63F 9/24* (2006.01)
*B41J 2/01* (2006.01)
(52) U.S. Cl. ................ 463/47; 463/30; 347/1; 347/49
(58) Field of Classification Search ............ 463/1, 463/30, 36, 43–44, 46; 273/148 R; 340/323 R; 347/1–2, 13, 20, 42, 49, 65, 108–109
See application file for complete search history.

(56) References Cited

U.S. PATENT DOCUMENTS

| | | | |
|---|---|---|---|
| 3,843,132 A | 10/1974 | Ferguson | |
| 4,890,832 A | 1/1990 | Komaki | |

(Continued)

FOREIGN PATENT DOCUMENTS

JP 09-113990 A 5/1997

(Continued)

OTHER PUBLICATIONS

'Math Adventure' & 'Word Adventure' by 7th Level with Summary within Packard Bell Software Collection list of titles, 35pp, (c) 1996.*

*Primary Examiner*—Mark Sager

(57) ABSTRACT

A video gaming device, comprising a housing that incorporates:
  communication means for receiving interaction data from at least one control device operable by a user;
  processing means for executing interactive program at least partially in reliance upon the interaction data, thereby to generate display images for output to an image display means; and
  a printer apparatus including a printhead, ink supply unit, and print media feed mechanism, said printer apparatus being operatively associated with said processing means to print one or more gaming images onto print media in response to execution of said interactive program, the gaming images being at least partially based on at least some of the display images.

20 Claims, 10 Drawing Sheets

U.S. PATENT DOCUMENTS

| | | | |
|---|---|---|---|
| 4,904,100 A * | 2/1990 | Enix .................... 400/613 |
| 5,291,243 A | 3/1994 | Heckman et al. |
| 5,419,543 A * | 5/1995 | Nakamura et al. ......... 271/9.01 |
| 5,462,375 A * | 10/1995 | Isobe et al. ................ 400/680 |
| 5,493,409 A | 2/1996 | Maeda et al. |
| 5,559,932 A * | 9/1996 | Machida et al. ........... 358/1.15 |
| 5,566,290 A | 10/1996 | Silverbrook |
| 5,665,249 A * | 9/1997 | Burke et al. ................... 216/2 |
| 5,666,141 A | 9/1997 | Matoba et al. |
| 5,678,001 A | 10/1997 | Nagel et al. |
| 5,718,631 A | 2/1998 | Invencion |
| 5,743,746 A * | 4/1998 | Ho et al. ..................... 434/332 |
| 5,768,382 A | 6/1998 | Schneier et al. |
| 5,802,274 A | 9/1998 | Dorak et al. |
| 5,816,918 A | 10/1998 | Kelly et al. |
| 5,829,745 A | 11/1998 | Houle |
| 5,931,467 A | 8/1999 | Kamille |
| 6,012,832 A | 1/2000 | Saunders |
| 6,200,216 B1 * | 3/2001 | Peppel ............................ 463/1 |
| 6,238,043 B1 * | 5/2001 | Silverbrook ................... 347/86 |
| 6,238,044 B1 * | 5/2001 | Silverbrook et al. .......... 347/86 |
| 6,626,529 B1 * | 9/2003 | King et al. .................. 347/104 |
| 6,835,135 B1 * | 12/2004 | Silverbrook et al. .......... 463/30 |
| 7,018,294 B1 * | 3/2006 | Silverbrook et al. .......... 463/30 |

FOREIGN PATENT DOCUMENTS

| | | |
|---|---|---|
| WO | WO 97/04353 A | 2/1997 |
| WO | WO 97/50243 | 12/1997 |

* cited by examiner

VIDEO GAMING DEVICE WITH INTEGRAL PRINTER FOR PRINTING GAMING IMAGES AT LEAST PARTIALLY BASED ON AT LEAST SOME OF THE DISPLAY IMAGES

CROSS REFERENCE TO RELATED APPLICATION

The present application is a continuation of U.S. application Ser. No. 10/636,194 filed on Aug. 8, 2003, which is a continuation in part of U.S. application Ser. No. 09/437,007 filed on Nov. 9, 1999, now issued as U.S. Pat. No. 6,835,135, all of which are herein incorporated by reference.

FIELD OF THE INVENTION

The present invention relates to the field of video games and, more particularly, to a video games console having an integral compact printer device.

SUMMARY OF THE INVENTION

In accordance with a first aspect of the present invention, there is provided a video gaming device, including a casing that includes a receptacle for accepting detachable storage means, the detachable storage means containing an interactive program, the casing incorporating:
  communication means for receiving interaction data from at least one control device operable by a user;
  processing means for executing said interactive program at least partially in reliance upon the interaction data, thereby to generate display images for output to an image display means; and
  a printer apparatus including a printhead, ink supply unit, and print media feed mechanism, said printer apparatus being operatively associated with said processing means to print one or more gaming images onto print media in response to execution of said interactive program.

In accordance with a second aspect of the invention, there is provided video game apparatus including:
  a receptacle for accepting detachable storage means, the detachable storage means containing an interactive program;
  communication means for receiving interaction data from at least one control device operable by a user;
  processing means for executing said interactive program at least partially in reliance upon the interaction data, thereby to generate display images for output to an image display means; and
  a printer apparatus including a printhead, ink supply unit, and print media feed mechanism;
  said printer apparatus being operatively associated with said processing means to automatically print one or more gaming images onto print media at one or more predetermined points during execution of the interactive program.

In accordance with a third aspect of the invention, there is provided a method of printing gaming information onto a substrate via a video gaming device, the video gaming device including:
  a receptacle for accepting detachable storage means, the detachable storage means containing an interactive program;
  communication means for receiving interaction data from at least one control device operable by a user;
  processing means; and
  a printer apparatus including a printhead, ink supply unit, and print media feed mechanism;
  the method including the steps of:
  (a) executing the interactive program at least partly in reliance on the interaction data via said processing means, thereby to generate display images;
  (b) outputting the display images for display on an image display means; and
  (c) printing, under instruction from the processing means, one or more gaming images onto print media in response to execution of said interactive program.

Preferably, the gaming images are different to the corresponding display images of the interactive program at the time of printing.

More preferably, the gaming images include interaction information that can be utilized by the user to change, or continue along, the course of the interactive program.

In a particularly preferred form, the gaming images are indicative of successful completion of a predetermined task or level of the interactive program. Typically, this is provided in the form of a certificate that preferably includes information indicative of a score or a user that attained the certificate.

In one embodiment, the one or more points are predetermined gaming events defined by the interactive program. Such points can, for example, be reached upon successful completion of a gaming goal by a user or users.

BRIEF DESCRIPTION OF THE DRAWINGS

A preferred embodiment of the invention will now be described, by way of example only, with reference to the accompanying drawings, in which.

DESCRIPTION OF PREFERRED AND OTHER EMBODIMENTS

In the illustrated preferred embodiment, there is provided a video game player which includes an integral printer which is able to print out, preferably on business card sized cards, information which enhances the interactivity of the video game.

Figure 1:
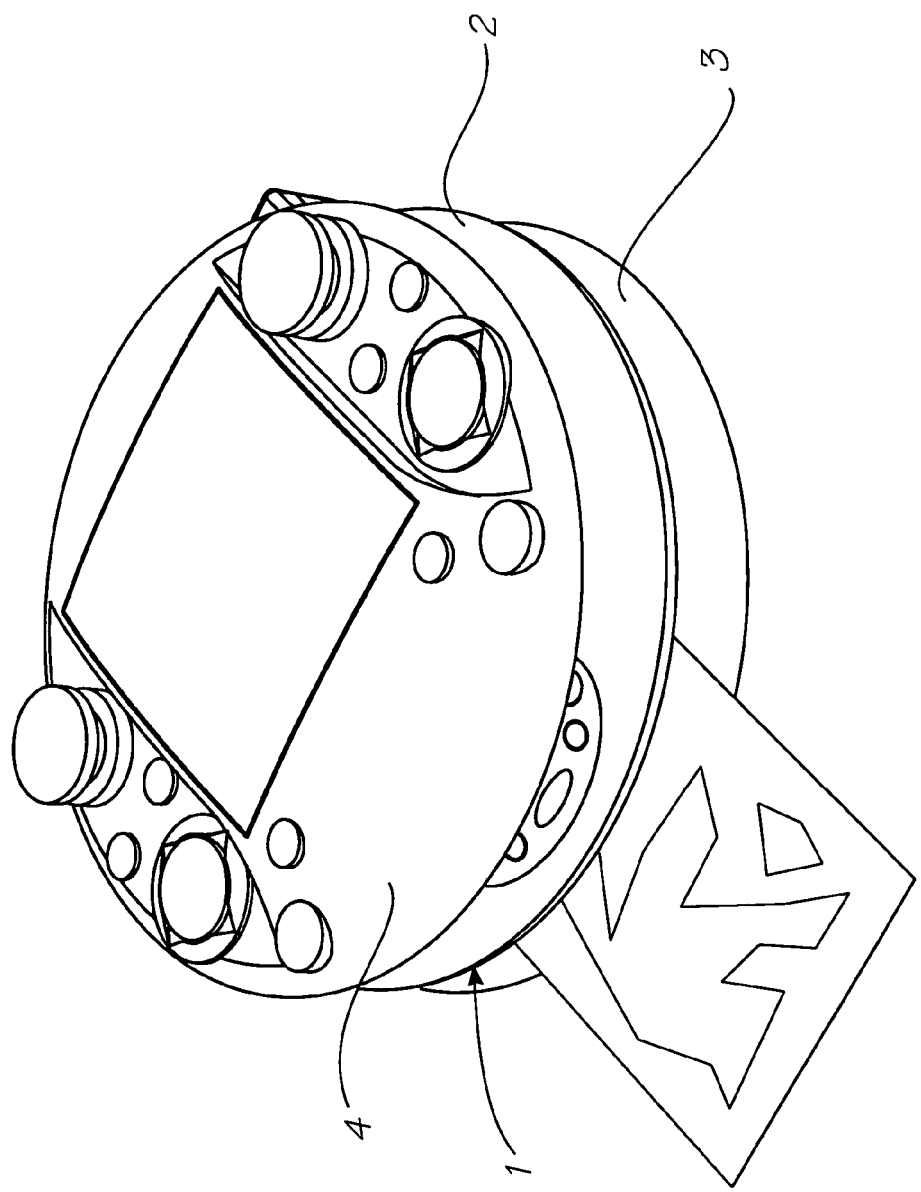
FIG. 1 is a front perspective view of a first embodiment video gaming device according to the invention with detachable controller module, illustrating a printed card being ejected from the integral printer.
Figure 2:
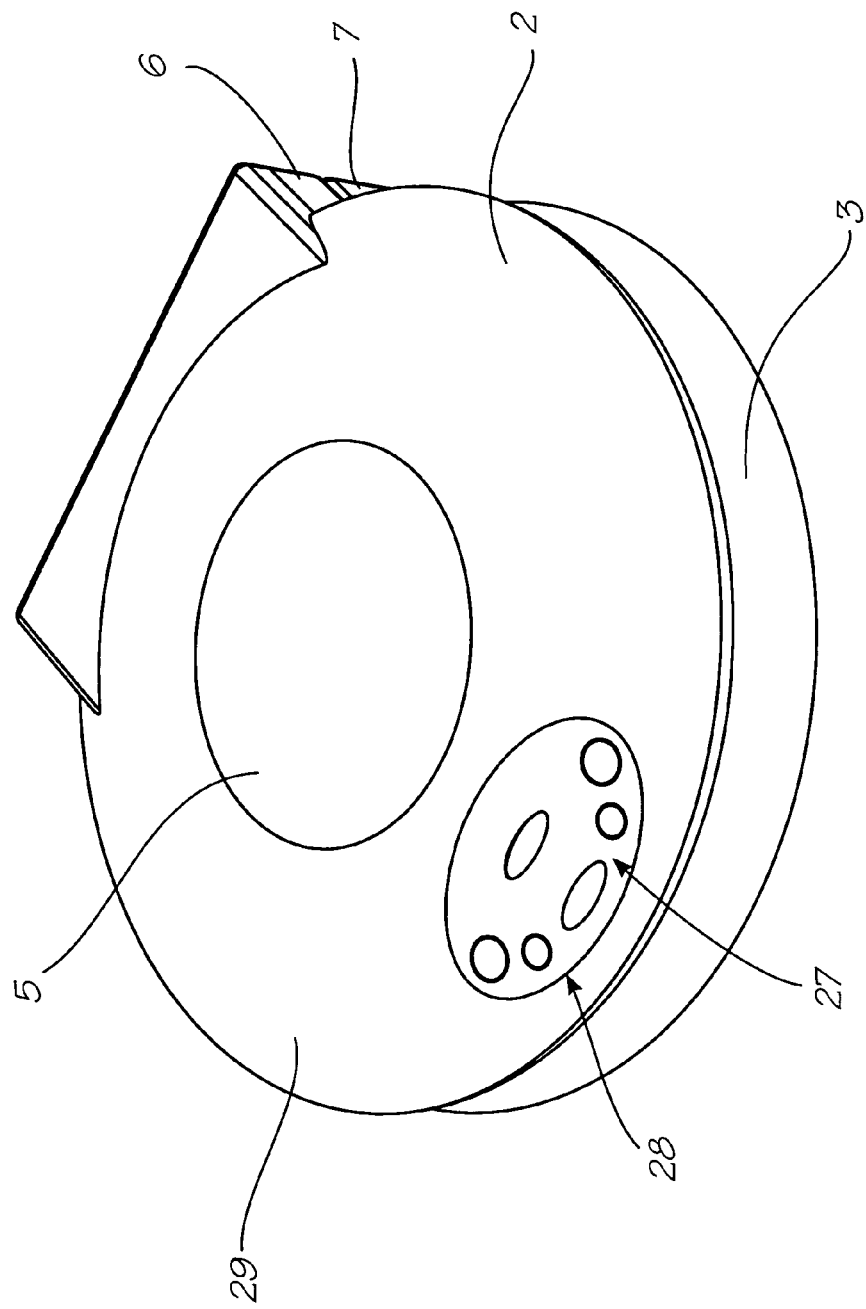
FIG. 2 is a front perspective view of the console comprising printer module and DVD module with the top controller module removed.

Turning to the drawings, there is shown a video gaming device in the form of a console 1 comprising a printer module 2 and Digital Versatile Disc (DVD) player module 3. Connected to the console is an optional detachable controller module 4 as shown in FIG. 1. The detachable controller module can communicate with the console by any suitable means including wireless systems such as "Bluetooth" or cable etc. and can be releasably secured to the console by any suitable means including magnetic coupling 5 or mechanical interlocking.

Figure 3:
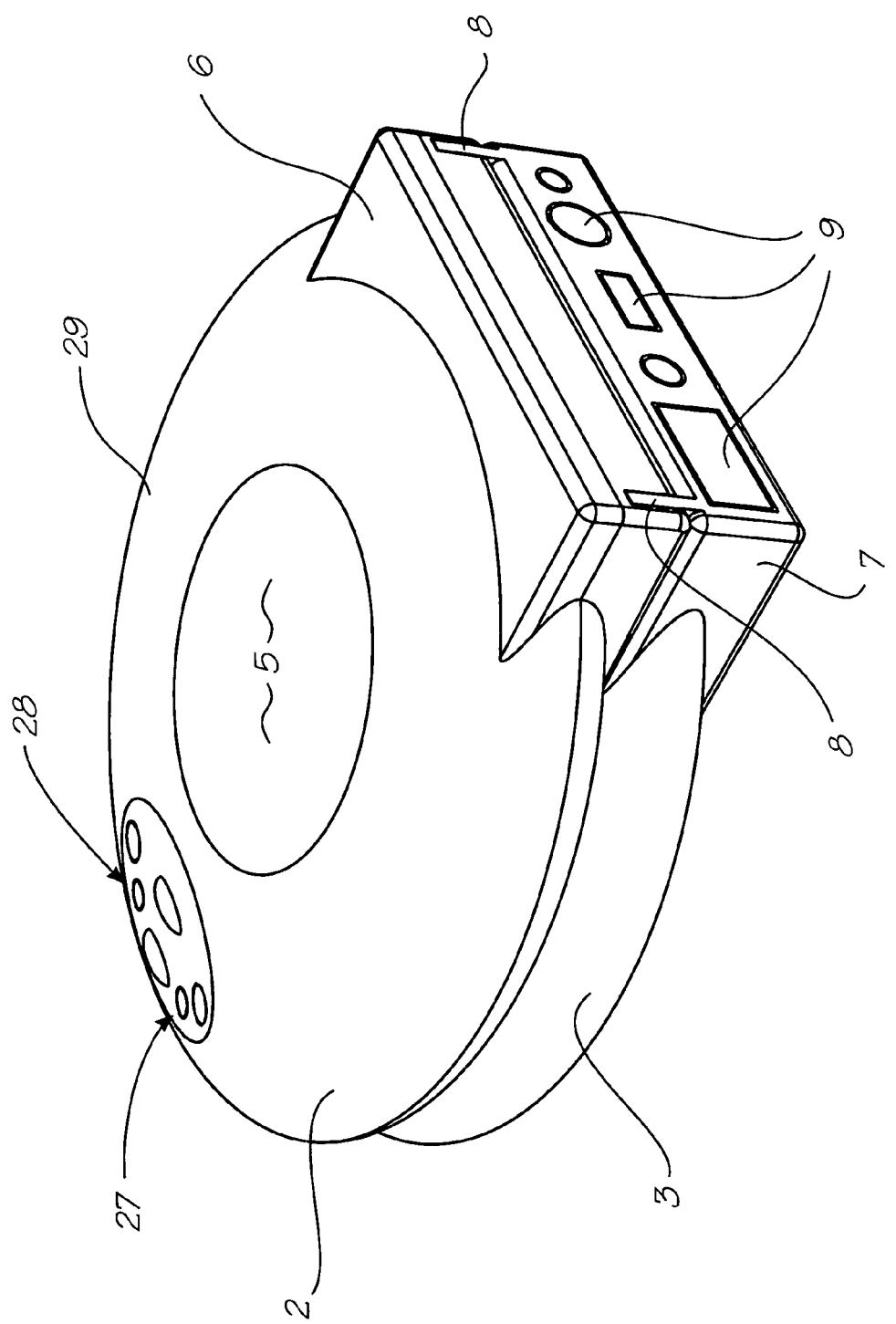
FIG. 3 is a rear perspective of the console shown in FIG. 2.
Figure 4:
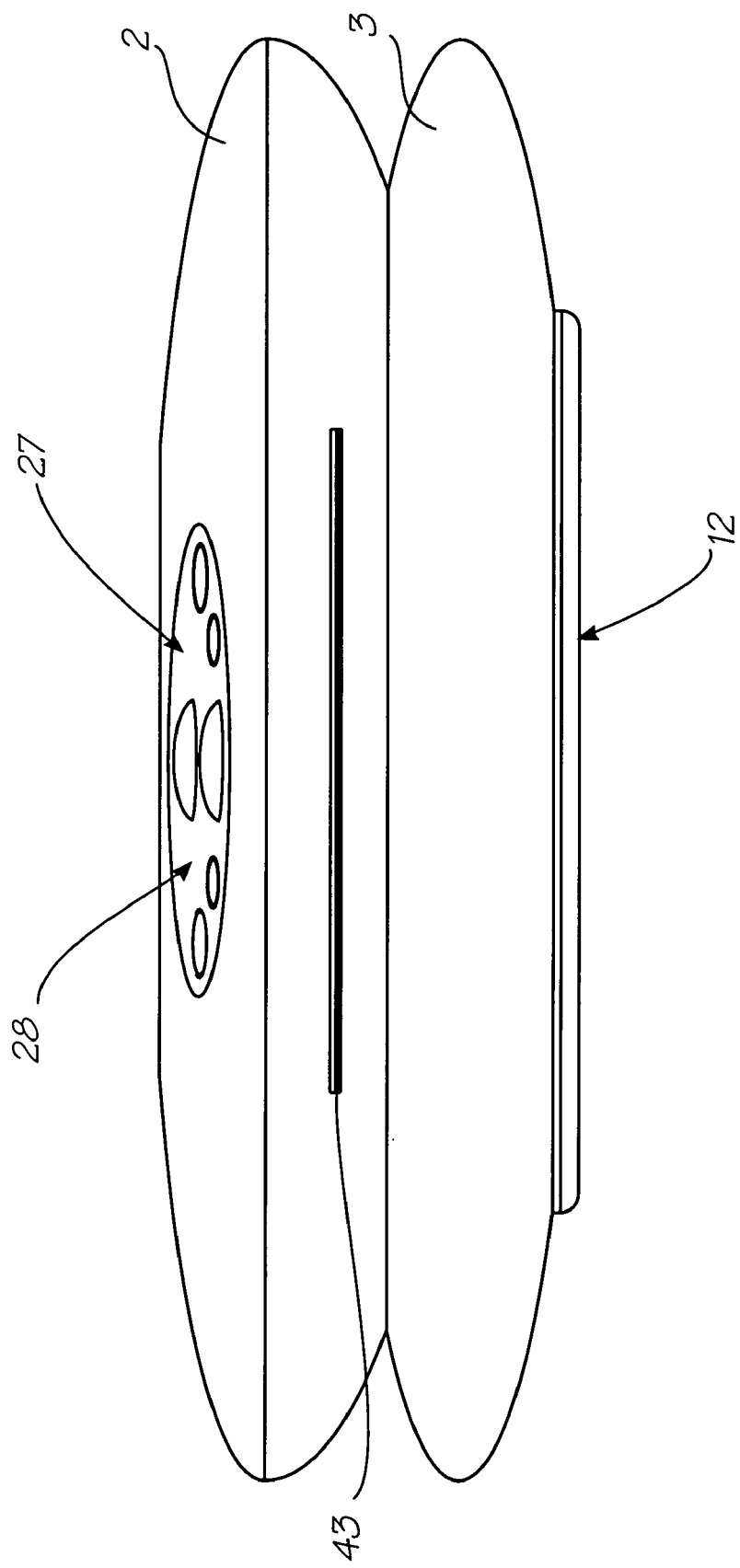
FIG. 4 is a front view of the console shown in FIGS. 2 and 3.
Figure 5:
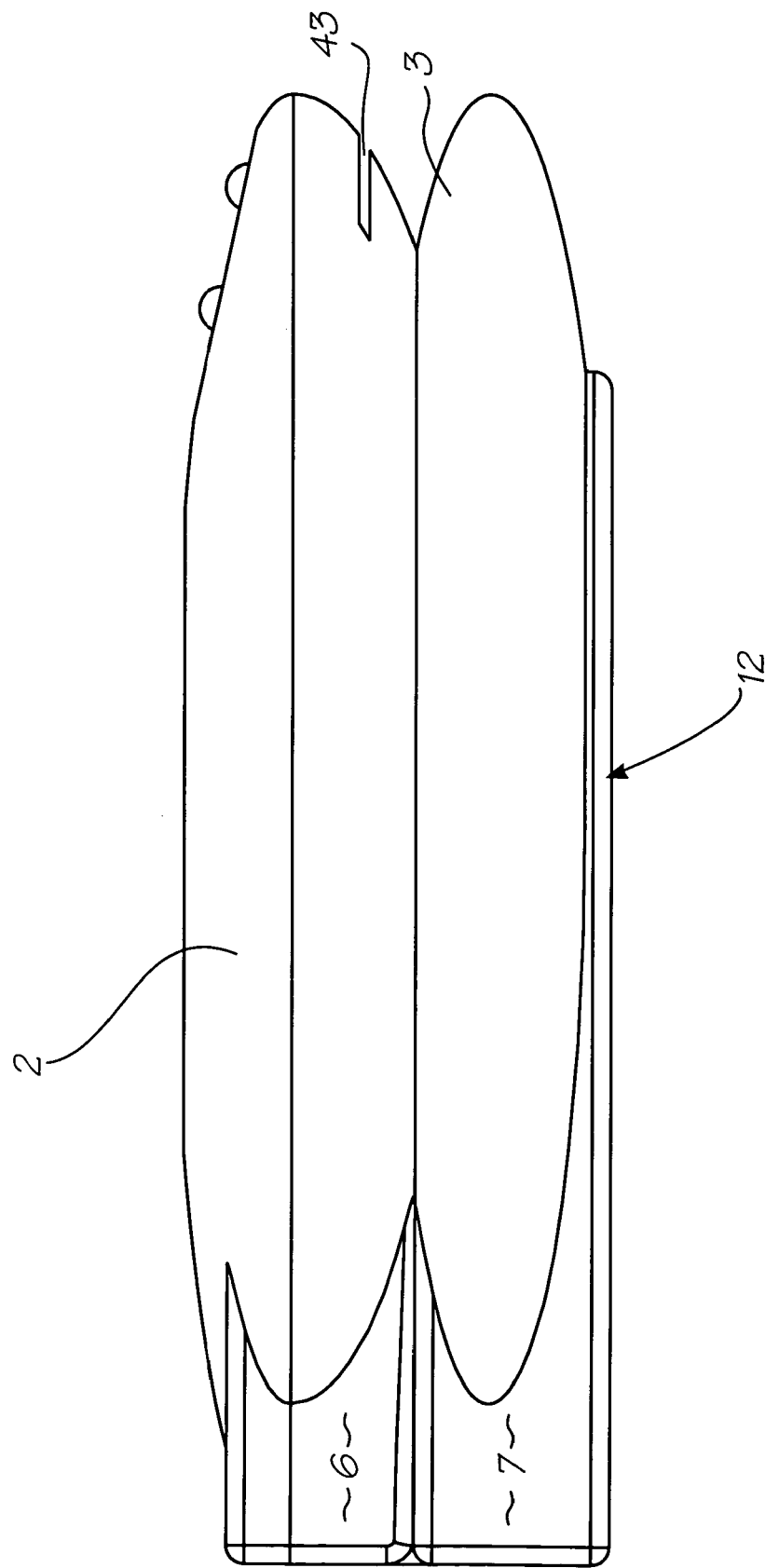
FIG. 5 is a side view of the console assembly shown in FIG. 4.
Figure 6:
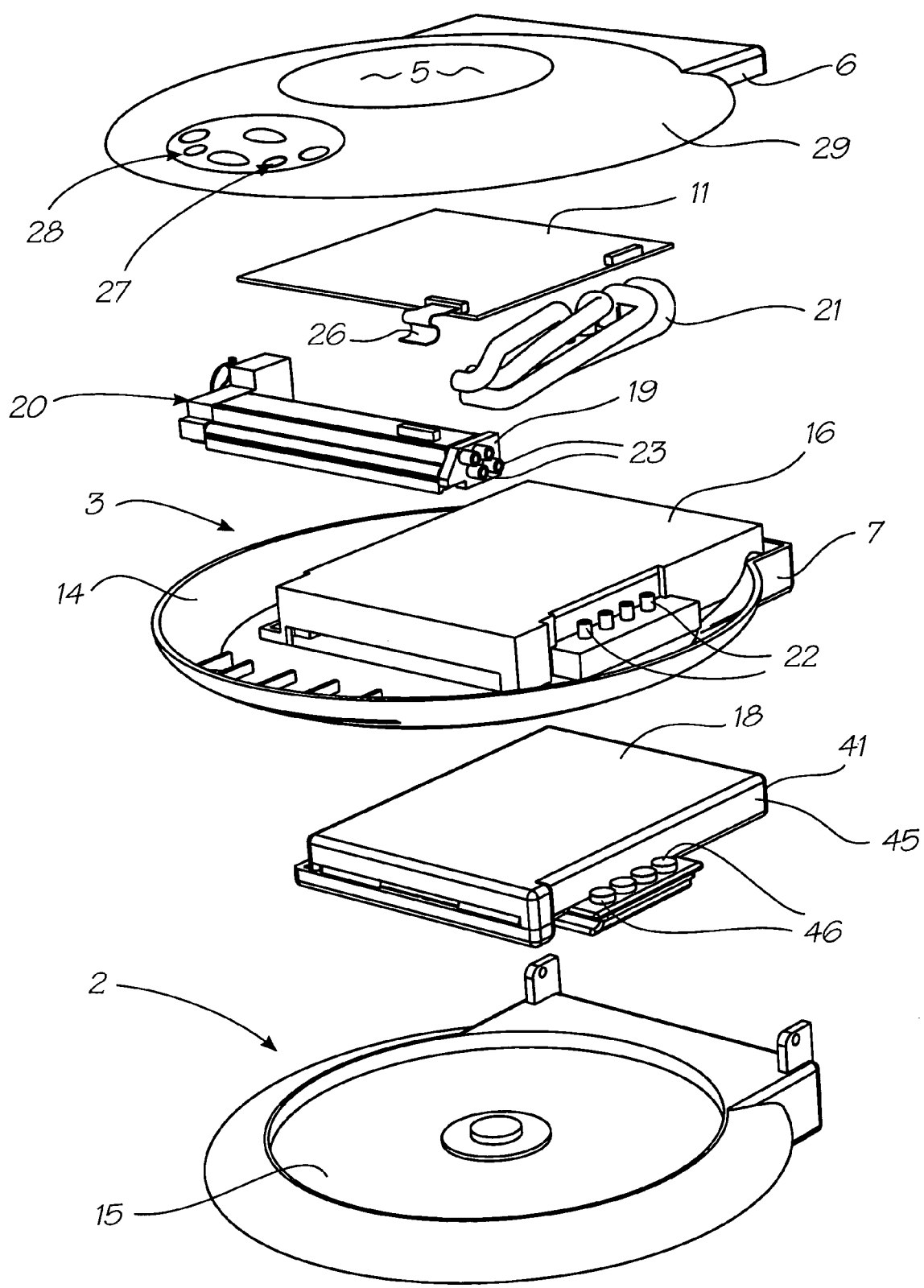
FIG. 6 is an exploded front perspective view of the console assembly shown in FIGS. 2 to 5.
Figure 7:
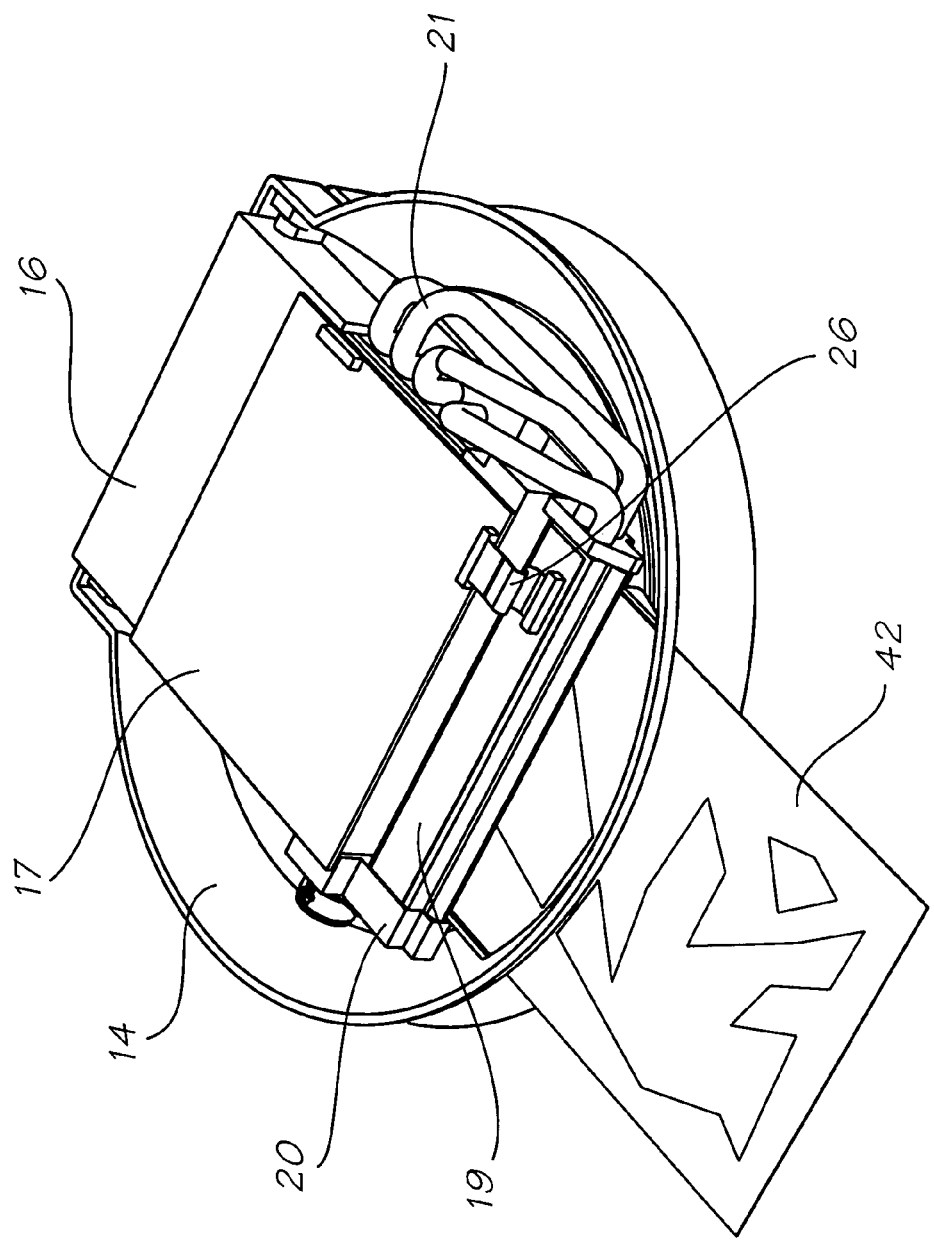
FIG. 7 is a front perspective view of the console with the printer module top cover removed.

The printer module 2 and DVD player module 3 are interconnected by means of connecting housing extensions 6 and 7 which hinge about pivots 8 as shown in FIG. 3. The lower connecting extension 7 preferably includes various input/output connectors and ports 9 for optionally connecting joysticks and other interactive devices. A video outlet port is also provided for connection with standard video type devices as is common in the art. Further ports can also be provided for an external power source or other devices such as sound systems to be interconnected to the console.

The DVD player module 3 is able to accept storage means in the form of standard DVD game discs 10 as is becoming popular in the industry. The END player is interconnected to a high-end processor (not shown), which can be constructed along similar lines to standard high-end video game processors. The processor in turn utilizes memory for standard video game functions and interacts with the print controller chip, which is also preferably housed with the high-end processor on PCB 11 within the printer module 2. The controller chip (also not shown) can be structured along the lines set out in Australian provisional application NO. PP7024, entitled 'Image creation method and apparatus' filed 9 Nov. 1998, the contents of which are again incorporated by cross reference. Batteries for driving the console are preferably located in the base of the DVD player module as shown by arrow 12.

The printer module 2 is preferably constructed so as to simultaneously provide a closure for the DVD player module 3. This is achieved by hinging the printer unit to the DVD module as shown. The printer module 2 comprises a base moulding 14 that is configured to fully enclose a DVD disk-receiving compartment 15 formed in the upper surface of the DVD player module 3. The base moulding 14 is further configured to define an integral chassis structure 16 adapted on its under side to receive and locate an ink and paper cartridge 18.

The upper surface of the chassis structure 16 is configured to support a printhead and ink distribution assembly 19, print media feed mechanism 20, and ink connecting hoses 21, the latter linking ink outlet nozzles 22 on the chassis with ink inlet nozzles 23 provided on the printhead and ink distribution assembly 19. The printer and DVD control PCB 10 is also supported on the chassis 16 and has flexible connections 26 extending therefrom to interconnect the DVD and printer control buttons 27 and 28 provided on a top cover moulding 29.

Figure 8:
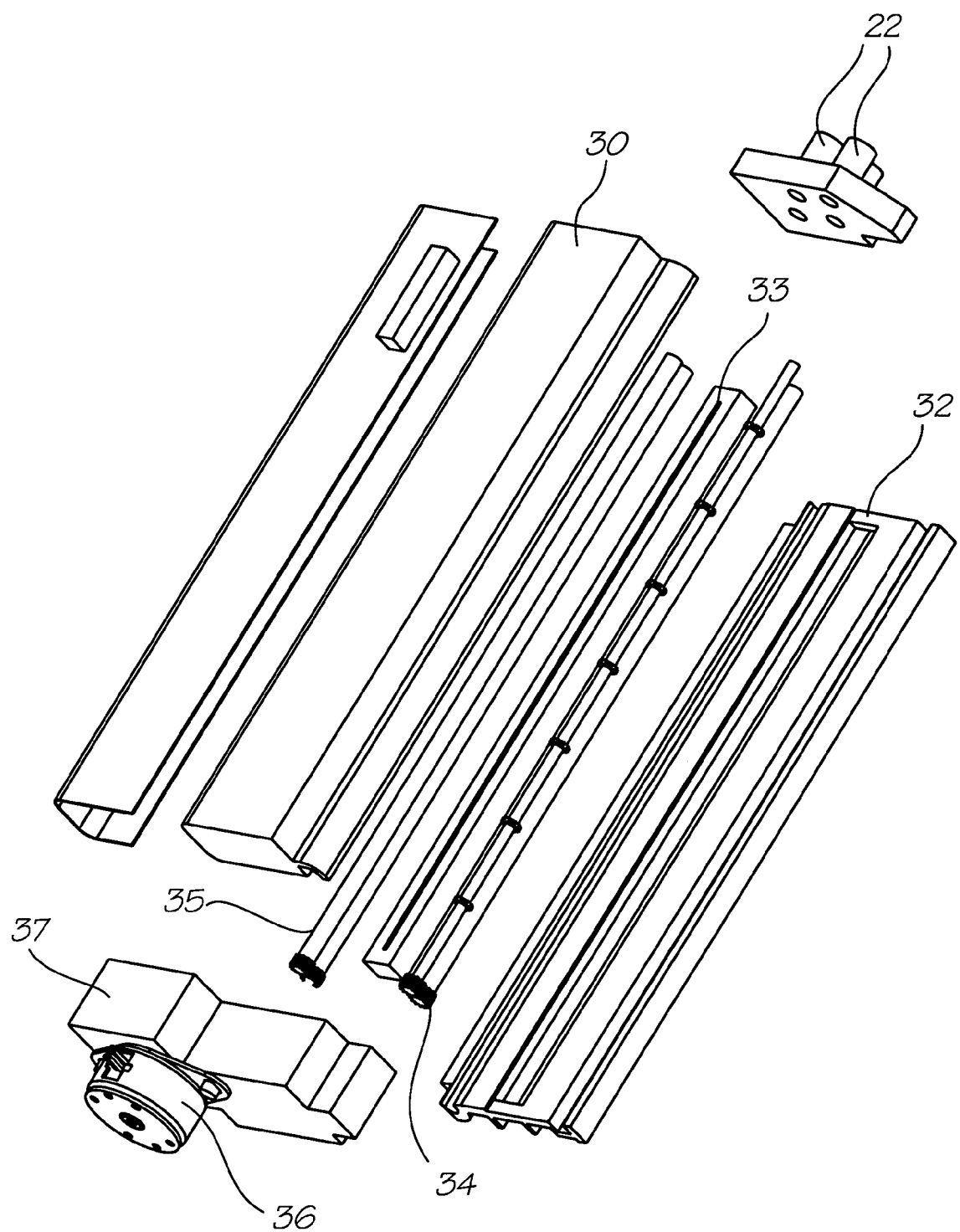
FIG. 8 is an exploded perspective view of the printer apparatus including the printhead, print media feed mechanism and printhead ink distribution assembly but excluding the ink supply.
Figure 9:
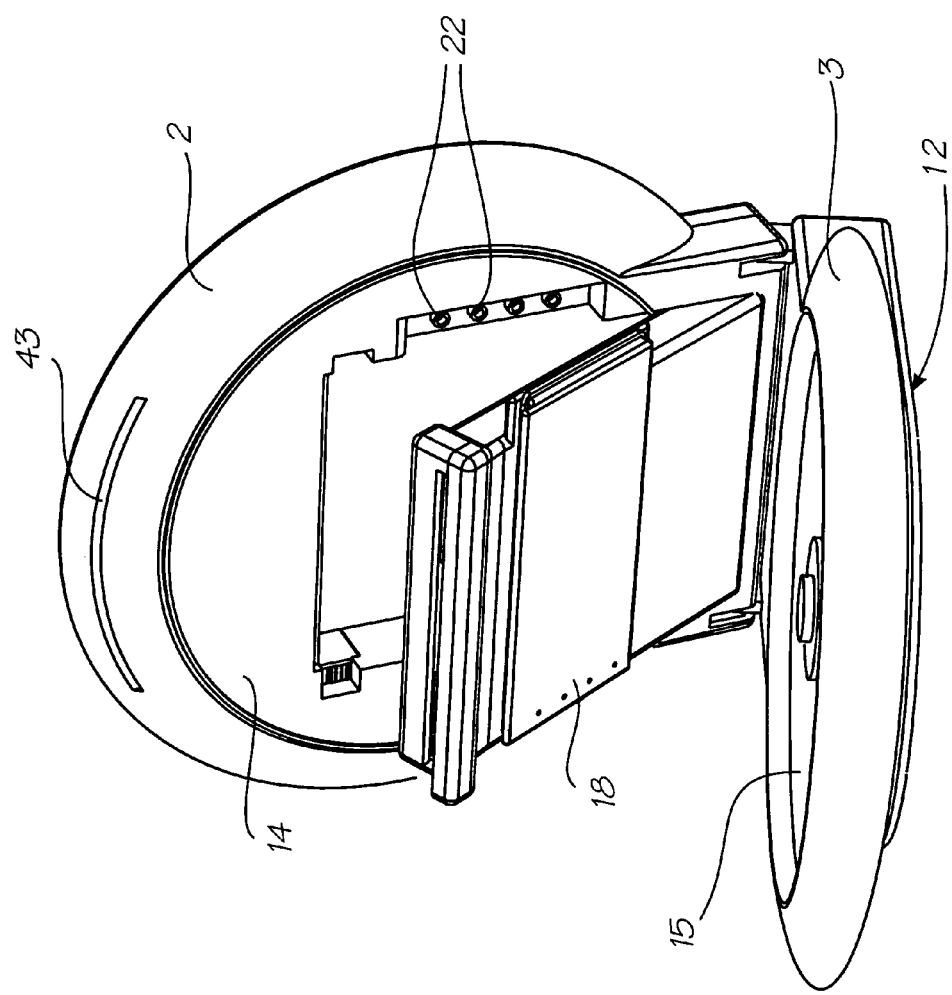
FIG. 9 is a front perspective view of the console showing the printer module in the raised position for insertion of the print media and ink supply cartridge.
Figure 10:
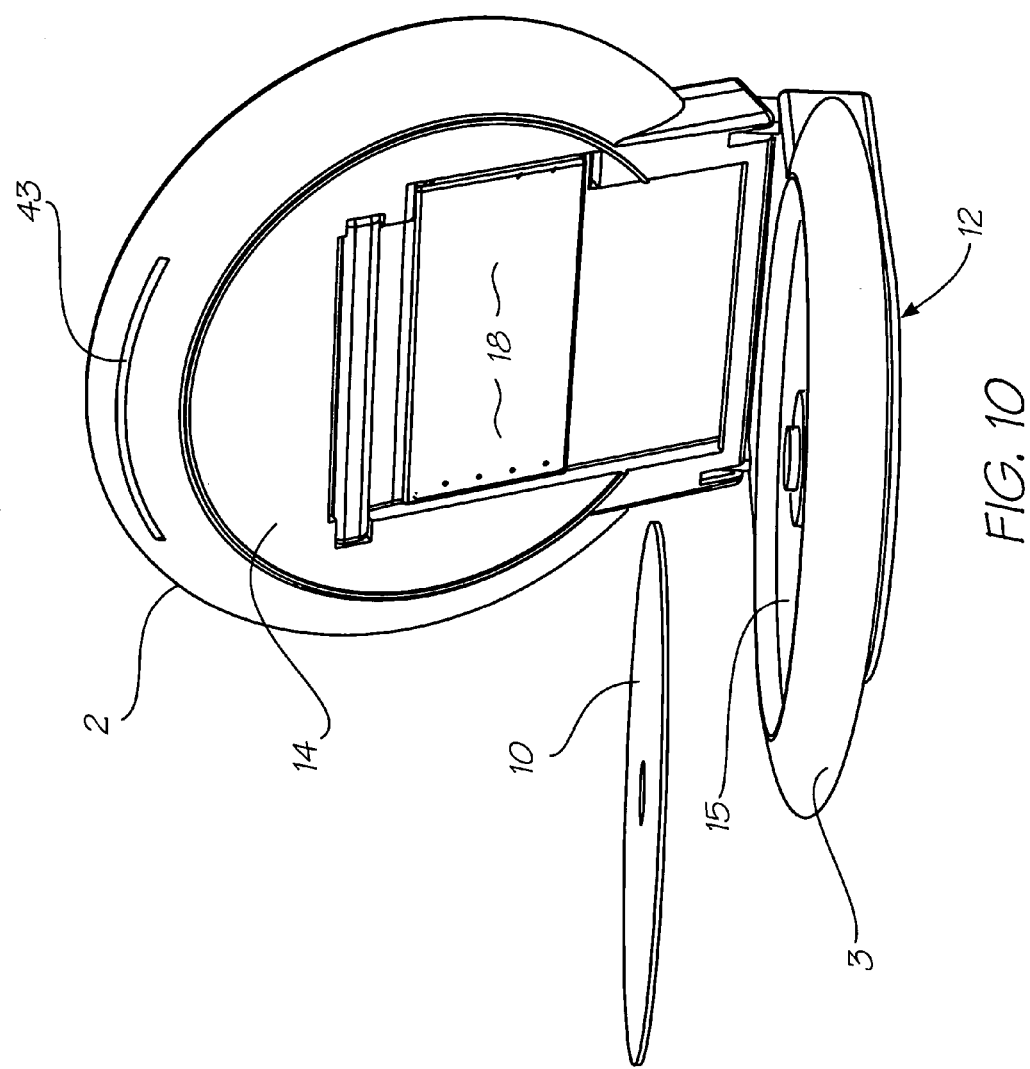
FIG. 10 is a schematic view of the assembly shown in FIG. 9 illustrating insertion of a DVD into the DVD player module.

Details of the printhead, ink distribution assembly and print media feed means are best illustrated in FIG. 8. The printhead, which is preferably in the form of a pagewidth ink jet printhead chip, is packaged with an ink distribution unit and printhead cover into a printhead module 30. This module 30 is supported on a printhead chassis moulding 32, and further includes a printhead capping mechanism 33, paired drive rollers 34 and 35, stepper motor 36 and an associated gear box 37 that engages the drive rollers 34 and 35.

The preferred ink and paper cartridge is preferably in accordance with that described in the applicant's co-pending U.S. patent application Ser. No. 09/436,508 the contents of which are incorporated herein by reference. In the alternate embodiment illustrated in the accompanying drawings the ink and paper cartridge comprises a casing 40 defining an upper print media storage region 41 adapted to hold a stack of paper cards or sheets 42. A card-dispensing outlet is shown at 43. The lower portion of the casing defines an ink supply region 45 that is separated internally into four sections each of which connect with piercable ink supply outlets 46. Upon installation, these outlets 46 are pierced by formations in the underside of the base moulding so that ink flows from the cartridge to the outlet nozzles on the chassis 16, via connecting hoses 21, to the printhead and ink distribution assembly 19.

In yet another embodiment, the printer unit and print media container can be snap fitted into the console.

In use, the console is connected to a video device and a DVD 48 is inserted into the DVD player module 3. Appropriate controllers are then selected. These may be the detachable controller module 1 as shown in FIG. 1, or alternatively other external interactive controllers. The printer can then be operated during execution of the program in the DVD either manually or automatically as discussed in more detail below.

It will be evident to those skilled in the art that the preferred embodiment provides for a video game system enabling print on demand cards. These cards can be utilized for a number of purposes. Firstly, the video game can, at certain predetermined levels, print out a series of 'brag cards'. These can provide a high-resolution picture that can only be achieved at a certain point in the game. The brag cards can be personalised with the game players name, score, chosen character, accumulated wealth or objects, etc. The cards could also include a photographic likeness where the video game arrangement includes an optional image sensor (not shown). With such an option, the brag cards could also be personalised with a photographic likeness mapping on to 3D characters etc.

The DVD player can be adapted to play standard DVD movies in addition to being configured to read CD-ROMs so as to provide information from encyclopaedias, maps etc provided by other CD-ROMs or DVD disks. In this manner, images from DVD movies and information from such CD-ROM or DVD repositories can be printed out. It should be noted that while the preferred form uses a DVD player or drive, the interactive programs may be stored on CD-ROM or on semiconductor memory cartridges, the latter being popularly used with pocket sized prior art video game devices.

Additionally, although the preferred embodiment described is designed for optional use with non portable external display and control devices, the game storage medium, controls, game processor, screen, audio and printer may all be housed in the same housing, and this may be pocket sized if required.

Where educational software is provided, the printer can be utilized to print out standard award certificates or diplomas upon reaching various levels. Such a system provides for an ideal incentive for children utilizing the system to become further involved in educational software running on the system. The utilization of the printer also allows parents to monitor children in the utilization of the device through, for example, the demanding of certain information or diploma certificates being printed out at various steps before the device can be utilized as a game-playing machine. The arrangement can be synergistic between the game playing and educational software, where the educational software prints out a code or clue for utilization by the user in playing the games. Of course, many other interactive uses can be provided.

It will be appreciated by those skilled in the art that numerous variations and/or modifications may be made to the present invention as shown without departing from the spirit or scope of the invention as broadly described. Accordingly, the present embodiment is to be considered in all respects to be illustrative and not restrictive.

I claim:

1. A video gaming device, comprising a housing that incorporates:
   a printer module; and
   a disc player module;
   the disc player module receiving a memory disc in an opening of said disc player module;
   the printer module and disc player module being interconnected by a hinge joint such that the printer module provides a closure for said opening of said disc player module;
   the device further including communication means for receiving interaction data from at least one control device operable by a user;
   processing means for executing an interactive program read from a disc within said opening of said disc player module; and
   a printer apparatus within said printer module including a printhead, ink supply unit, and print media feed mechanism, said printer apparatus being operatively associated with said processing means to print one or more gaming images onto print media in response to execution of said interactive program, the gaming images being at least partially based on at least some of the display images.

2. A video gaming device according to claim 1 including an integral internal print media supply unit.

3. A video gaming device according to claim 2, wherein said print media is in the form of sheets of paper or card.

4. A video gaming device as claimed in claim 3, wherein said sheets are substantially business card size.

5. A video gaming device according to claim 2, wherein the print media and ink supply unit are housed in a replaceable cartridge assembly.

6. A video gaming device according to claim 5, wherein said cartridge includes a print media feed roller device for interacting with the print media feed mechanism to feed media from the cartridge to the printhead as required.

7. A video gaming device as claimed in claim 1, wherein said one or more gaming images are printed via said printer at one or more points of said interactive program.

8. A video gaming device as claimed in claim 7, wherein said one or more points are predetermined gaming events defined by the interactive program.

9. A video gaming device as claimed in claim 8, wherein said one or more points are reached upon successful completion of a gaming goal by a user or users.

10. A video gaming device as claimed in claim 1, wherein said printhead comprises an inkjet printhead.

11. A video gaming device as claimed in claim 10, wherein said ink jet printhead comprises a pagewidth array of ink ejection nozzles configured to selectively eject ink by means of a series of actuators.

12. A video gaming device as claimed in claim 11, wherein said actuators are thermal bend actuators.

13. A video gaming device as claimed in claim 10, wherein said printhead is a microelectromechanical system (MEMS) printhead.

14. A video gaming device as claimed in claim 1, wherein said communication means comprises a wireless Communication system.

15. A video gaming device as claimed in claim 1, including a detachable controller module incorporating a variety of interactive control devices.

16. A video gaming device as claimed in claim 15, wherein said controller module is releasably connected with said console by means of a magnetic coupling.

17. A video gaming device as claimed in claim 9, wherein the gaming images are different to the corresponding display images.

18. A video gaming device as claimed in claim 9, wherein the gaming images are indicative of successful completion of a predetermined task or level of the interactive program.

19. A video gaming device as claimed in claim 18, wherein the gaming images take the form of one or more certificates.

20. A video gaming device as claimed in claim 19, wherein the certificate includes information indicative of a score or a user that attained the certificate.

* * * * *